(No Model.)
H. TIMKEN.
VEHICLE SPRING.
No. 361,244. Patented Apr. 12, 1887.
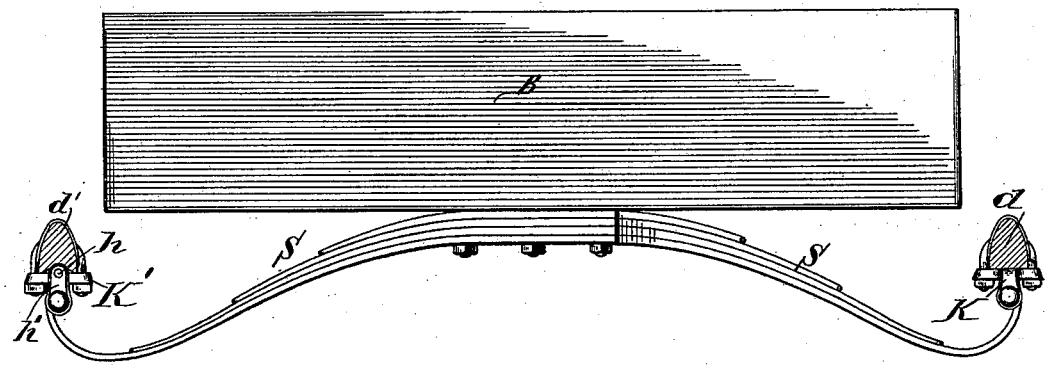
Attest:
Charles Pickles
G. W. Hinchman Jr.
Inventor:
Henry Timken

UNITED STATES PATENT OFFICE.

HENRY TIMKEN, OF ST. LOUIS, MISSOURI.

VEHICLE-SPRING.

SPECIFICATION forming part of Letters Patent No. 361,244, dated April 12, 1887.

Application filed November 20, 1885. Serial No. 183,452. (No model.)

*To all whom it may concern:*

Be it known that I, HENRY TIMKEN, of the city of St. Louis, in the State of Missouri, have invented a certain new and useful Improvement in Vehicle-Springs, of which the following is a full, clear, and exact description, reference being had to the accompanying drawing, forming part of this specification, and which shows the end of the wagon, the spring supporting the same, and the shackles which secure the extremities of said springs to the respective side bars in elevation, said side bars being represented in transverse section.

My invention relates to certain improvements in springs for use on side-bar vehicles; and it consists in attaching one end of the cross spring or springs to the side bar or sill of the vehicle with a rigid shackle or permanent attachment and the other end with a swinging or loose shackle, so that the body of the vehicle will be held from oscillating from side to side by the rigid or permanent attachment, and at the same time the spring or springs will be permitted, by the use of the swinging or loose shackle, to spread or contract between its ends as it moves up and down, thus avoiding the necessity of the side bars springing out and in at every downward or upward movement of the springs.

Referring to the drawing, B represents the body of the vehicle, made in any ordinary way and supported by springs S, which connect it to the side bars or sills, $d$. One end of each spring, the springs being shown and preferably made in two parts each, and the two parts of each spring are here spoken of as one spring, is attached to a side bar, $d$, by a rigid shackle, K, and the other end to a side bar, $d'$, by a loose or swinging shackle, K'.

It is obvious that the two ends of each spring, as the body falls and rises, will spread out and contract toward each other—that is, the outer ends of each spring will recede from and return toward each other as the body and springs move up and down—and when both ends of each spring are rigidly attached to the side bars the bars must necessarily be forced in and out at each movement of the springs and body, and when both ends of each spring are attached to the side bars by loose shackles then the body oscillates from side to side and strikes against the side bars, as well as wearing rapidly the joints of the shackles, causing them to rattle and become unserviceable. My invention overcomes both of these objections, the rigid shackles or permanent attachments preventing the body from lateral oscillation, and the loose or swinging shackles taking up the spread of the springs, and permitting the body to move up and down freely without spreading or straining the side bars. It is obvious that these shackles, as arranged, can be adapted to any cross spring or springs which connect the body of a vehicle to the side bars.

I do not wish to confine myself to any particular kind of cross spring or springs. (One or more may be used.)

I am aware that it is old to connect a body of a vehicle to the head-block and rear axle by a spring having a permanent shackle at one end and a loose shackle at the other, the loose shackle being provided with means for limiting the action of the spring; and I am also aware that it is old to connect the body of a vehicle to side bars by a spring and permanent shackles, one of which is so connected to the spring as to permit of an endwise movement of the spring thereon. Therefore I do not make claim to either of these arrangements; but What I do claim, and desire to secure by Letters Patent of the United States, is—

1. In a side-bar vehicle, the body connected to the side bars by a spring, one end of the spring being made fast to one of the side bars by a permanent or rigid shackle and the other end to the other side bar by a loose or swinging shackle, said loose shackle being hinged to the side bar by a common clip, one end of said shackle being pivoted to the under side of said clip and the other end pivoted to the eye of the spring, all operating to permit the body to move up and down freely and close to the side bars without rubbing or striking the same.

2. The combination, in a side-bar vehicle, of the body, side bars, connecting-springs, and tight and loose shackles, the springs being secured to one side bar by a tight shackle and to the opposite side bar by a loose or swinging shackle, said loose or swinging shackle being hung to the side bar by a common clip surrounding the side bar, one end of the shackle being pivoted to the under side of the clip and the other end pivoted in the eye of the spring, all operating to allow the body to move up and down freely and close to the side bars without rubbing or striking the side bars of the vehicle.

HENRY TIMKEN.

Attest:
WM. M. ECCLES,
L. FRANK OTTOFY.